United States Patent
Hsin et al.

(10) Patent No.: US 11,398,861 B2
(45) Date of Patent: Jul. 26, 2022

(54) WI-FI EXTENDER AND ASSOCIATED ANTENNA SELECTION METHOD

(71) Applicant: Wistron NeWeb Corporation, Hsinchu (TW)

(72) Inventors: Chiung-Wen Hsin, Hsinchu (TW); Kuo-Chin Huang, Hsinchu (TW); Szu-Yuan Chen, Hsinchu (TW)

(73) Assignee: Wistron NeWeb Corporation, Hsinchu (TW)

( * ) Notice: Subject to any disclaimer, the term of this patent is extended or adjusted under 35 U.S.C. 154(b) by 17 days.

(21) Appl. No.: 17/149,687

(22) Filed: Jan. 14, 2021

(65) Prior Publication Data

US 2021/0297143 A1    Sep. 23, 2021

(30) Foreign Application Priority Data

Mar. 23, 2020    (TW) .................................. 109109574

(51) Int. Cl.
| | |
|---|---|
| *H04B 7/155* | (2006.01) |
| *H04L 43/10* | (2022.01) |
| *H04B 17/345* | (2015.01) |
| *H04L 43/0894* | (2022.01) |
| *H04B 17/318* | (2015.01) |
| *H04W 84/12* | (2009.01) |

(52) U.S. Cl.
CPC ....... *H04B 7/15507* (2013.01); *H04B 17/318* (2015.01); *H04B 17/345* (2015.01); *H04L 43/0894* (2013.01); *H04L 43/10* (2013.01); *H04W 84/12* (2013.01)

(58) Field of Classification Search
CPC ............. H04B 7/15507; H04B 17/318; H04B 17/345; H04B 17/309; H04B 17/382; H04L 43/0894; H04W 84/12

USPC ........................................................ 370/315
See application file for complete search history.

(56) References Cited

U.S. PATENT DOCUMENTS

| | | | | |
|---|---|---|---|---|
| 2005/0095987 | A1* | 5/2005 | Lyons ................. | H04B 17/309 455/67.11 |
| 2005/0266903 | A1* | 12/2005 | Masaki ............... | G06F 1/1616 455/562.1 |
| 2009/0224847 | A1* | 9/2009 | Cezanne ............. | H01Q 9/16 333/139 |

FOREIGN PATENT DOCUMENTS

| | | | |
|---|---|---|---|
| CA | 2325124 A1 * | 5/2001 | |
| TW | 201347305 A | 11/2013 | |

* cited by examiner

*Primary Examiner* — Kwang B Yao
*Assistant Examiner* — Syed M Bokhari
(74) *Attorney, Agent, or Firm* — Winston Hsu

(57) ABSTRACT

The present invention discloses an antenna selection method, where the antenna selection method includes the steps of: utilizing a first vertical polarized antenna and a second vertical polarized antenna to obtain a first signal; calculating a first signal quality parameter according to the first signal; utilizing the first vertical polarized antenna and a horizontal polarized antenna to obtain a second signal; calculating a second signal quality parameter according to the second signal; and selecting one of the second vertical polarized antenna and the horizontal polarized antenna according to the first signal quality parameter and the second signal quality parameter, to be matched with the first vertical polarized antenna for subsequent signal transmission and reception.

6 Claims, 3 Drawing Sheets

WI-FI EXTENDER AND ASSOCIATED ANTENNA SELECTION METHOD

BACKGROUND OF THE INVENTION

1. Field of the Invention

The present invention is related to WI-FI extenders.

2. Description of the Prior Art

As the size of Wi-Fi extenders becomes smaller, the number of antennas that are able to be disposed in a product is limited. In a 2×2 Multi-input Multi-output (MIMO) system, the antenna design may comprise two vertical polarized antennas, or one vertical polarized antenna and one horizontal polarized antenna. These two designs have respective pros and cons depending on the environment in which they are applied. A designer cannot realize the respective advantages of the two designs at the same time.

SUMMARY OF THE INVENTION

This in mind, an objective of the present invention is to provide an antenna selection method for a Wi-Fi extender, which can compare signal qualities to select an antenna matching arrangement having a better signal quality, for solving the problems of the related art.

One embodiment of the present invention discloses an antenna selection method. The antenna selection method comprises the following steps: utilizing a first vertical polarized antenna and a second vertical polarized antenna to obtain a first signal; calculating a first signal quality parameter according to the first signal; utilizing the first vertical polarized antenna and a horizontal polarized antenna to obtain a second signal; calculating a second signal quality parameter according to the second signal; and selecting one of the second vertical polarized antenna and the horizontal polarized antenna according to the first signal quality parameter and the second signal quality parameter to be matched with the first vertical polarized antenna for subsequent signal transmission and reception.

Another embodiment of the present invention discloses a Wi-Fi extender. The Wi-Fi extender comprises a first vertical polarized antenna, a second vertical polarized antenna, a horizontal polarized antenna and a processing circuit. The processing circuit utilizes the first vertical polarized antenna and the second vertical polarized antenna to obtain a first signal, for calculating a first signal quality parameter according to the first signal, and utilizes the first vertical polarized antenna and the horizontal polarized antenna to obtain a second signal, for calculating a second signal quality parameter according to the second signal; and the processing circuit selects one of the second vertical polarized antenna and the horizontal polarized antenna according to the first signal quality parameter and the second signal quality parameter to be matched with the first vertical polarized antenna for subsequent signal transmission and reception.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
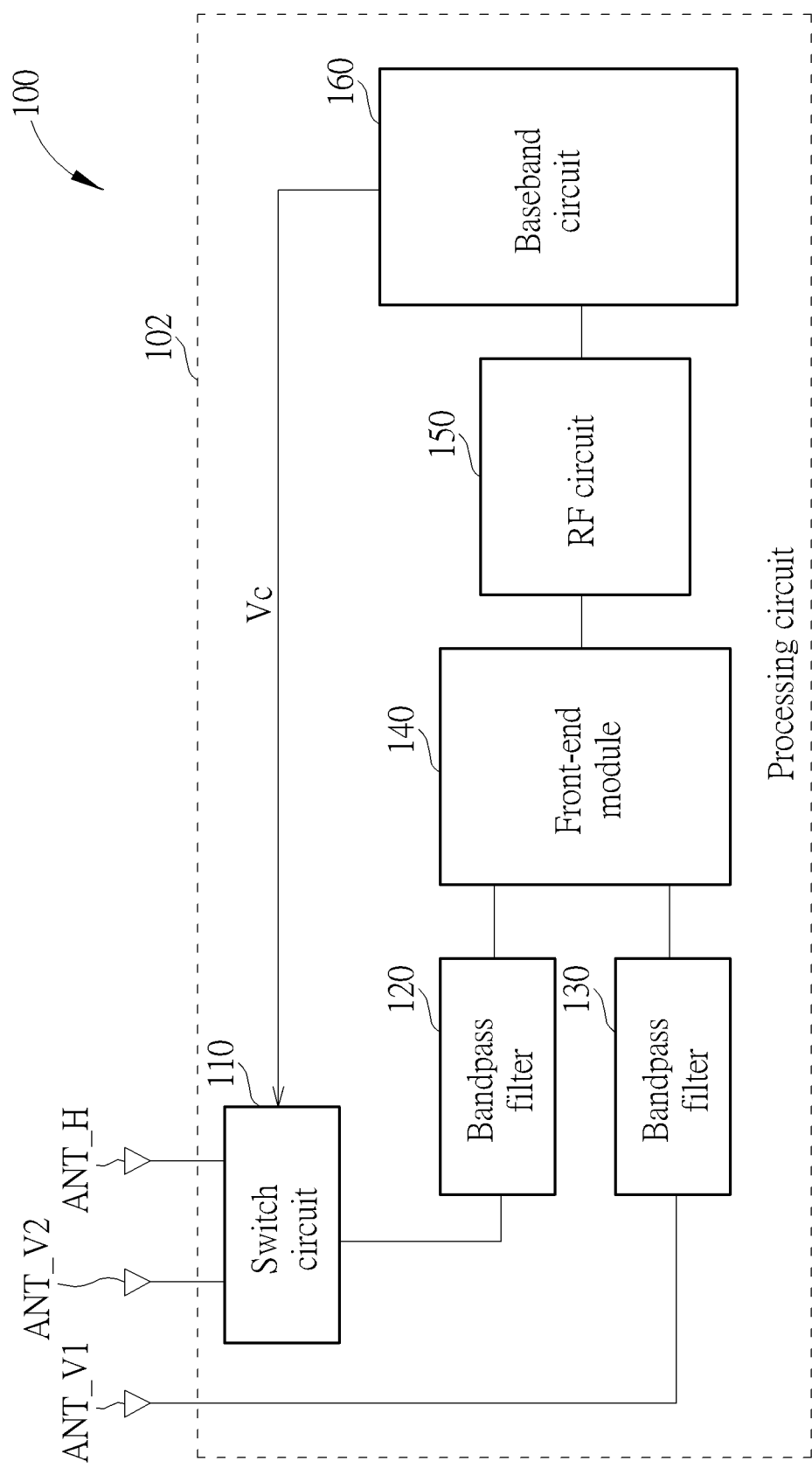
FIG. 1 is a diagram illustrating a Wi-Fi extender according to an embodiment of the present invention.

FIG. 1 is a diagram illustrating a Wi-Fi extender 100 according to an embodiment of the present invention. As shown in FIG. 1, the Wi-Fi extender 100 comprises two vertical polarized antennas ANT_V1 and ANT_V2, one horizontal polarized antenna ANT_H and a processing circuit 102, where the processing circuit 102 comprises a switch circuit 110, two bandpass filters 120 and 130, a front-end module 140, a radio frequency (RF) circuit 150 and a baseband circuit 160. In this embodiment, the Wi-Fi extender 100 is configured to be installed on a wall or a desktop, and only has three antennas mentioned above in order to reduce a size of the Wi-Fi extender 100.

In one embodiment, as a low frequency band of 5 Gigahertz (5 GHz) is set as a backhaul in a wireless network system (e.g. Wi-Fi system), the Wi-Fi extender 100 may be applied to signal reception and transmission of the 5 GHz low frequency band, but the present invention is not limited thereto.

It should be noted that there are multiple components depicted in the processing circuit 102: the bandpass filters 120 and 130 are configured to select in-band contents for transmission, the front-end module 140 comprises amplifier(s) and associated noise processing circuit(s), and the RF circuit 150 comprises components such as amplifier(s) and mixer(s) for RF signal processing. As basic operations of these components are well known by those skilled in this art, and this embodiment focuses on the operation of the baseband circuit 160 generating a control signal Vc to perform antenna selection via the switch circuit 110, detailed operations of a portion of these components are omitted here for brevity When operating the Wi-Fi extender 100, the processing circuit 102 may selectively utilize two vertical polarized antennas ANT_V1 and ANT_V2 for signal transmission and reception, or utilize the vertical polarized antenna ANT_V1 and the horizontal polarized antenna ANT_H for signal transmission and reception. In general, when the two vertical polarized antennas ANT_V1 and ANT_V2 are utilized for signal transmission and reception, the Wi-Fi extender 100 may have a better communications quality in a horizontal plane (e.g. X-Y plane) and may have better beamforming; but the Wi-Fi extender 100 may have a worse communications quality in a vertical direction (e.g. Z direction, such as transmission across floors) and may have worse antenna isolation performance. By comparison, when the vertical polarized antennas ANT_V1 and the horizontal polarized antenna ANT_H are utilized for signal transmission and reception, the Wi-Fi extender 100 may have a better communications quality in the vertical direction and may have better antenna isolation performance; but the Wi-Fi extender 100 may have a worse communications quality in the horizontal plane and may have worse beamforming. As the Wi-Fi extender 100 is a portable device, and relative positions between the Wi-Fi extender 100 installed by a user and other electronic devices which require wireless communications are not fixed, this embodiment provides an antenna selection mechanism, which can detect a signal quality of using the two vertical polarized antennas ANT_V1 and ANT_V2 and a signal quality of using the vertical polarized antenna ANT_V1 and the horizontal polarized antenna ANT_H, in order to determine which one of the vertical polarized antenna ANT_V2 and the horizontal polarized antenna ANT_H will be utilized to be matched with the vertical polarized antenna ANT_V1 for subsequent signal transmission and reception.

Figure 2:
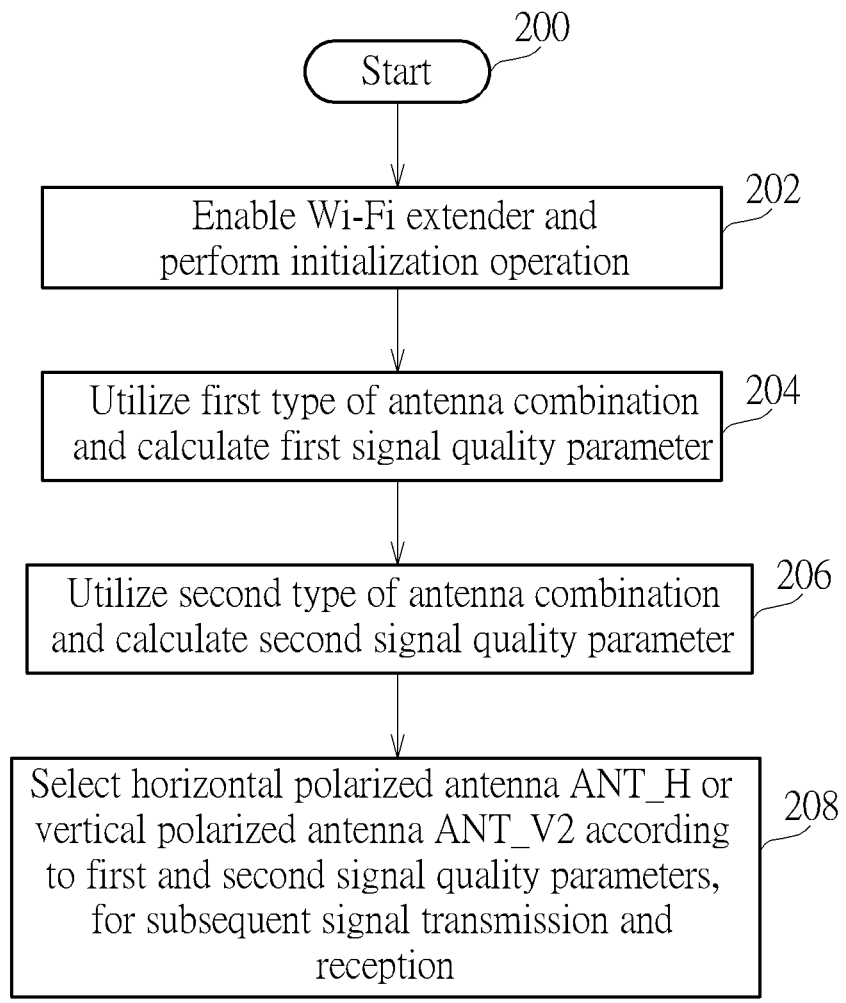
FIG. 2 is a flowchart illustrating an antenna selection method according to an embodiment of the present invention.

FIG. 2 is a flowchart illustrating an antenna selection method according to an embodiment of the present invention. As shown in FIG. 2, in Step 200, the flow starts, and the user installs the Wi-Fi extender 100 which is then powered on. In Step 202, the user pushes a button of the Wi-Fi extender 100 or enables other activating mechanisms, to perform an initialization operation and operations such as signal search detection. In Step 204, the Wi-Fi extender 100 selects a first type of antenna combination, and utilizes the first type of antenna combination to receive signals for calculating corresponding quality parameters. In particular, the baseband circuit 160 within the processing circuit 102 generates the control signal Vc to the switch circuit 110 for setting the vertical polarized antenna ANT_V2, i.e. the two vertical polarized antenna ANT_V1 and ANT_V2 are configured as the first type of antenna combination for signal transmission and reception. The switch circuit 110 may disable connection between the horizontal polarized antenna ANT_H and the bandpass filter 120 at this point. The processing circuit 102 may then obtain a first signal through various signal transmission mechanisms, and calculate a first signal quality parameter according to the first signal. In one embodiment, the processing circuit 102 may transmit one or more ping packets to external electronic devices (such as routers, wireless routers, or access points). As the ping packets may be packaged as one radiotap frame before being transmitted, and a radiotap header of this radiotap frame comprises information such as a noise field (signal strength), a signal field (signal strength) and a rate, the processing circuit 102 may calculate a first Received Signal Strength Indication (RSSI) and a first physical layer (PHY) rate according to the radiotap frame(s), to be the first signal quality parameter. As content of the radiotap header is well known by those skilled in the art of the IEEE 802.11 specification, detailed structure of the radiotap header is omitted here for brevity.

In Step 206, the Wi-Fi extender 100 selects a second type of antenna combination, and utilizes the second type of antenna combination to receive signals for calculating corresponding quality parameters. In particular, the baseband circuit 160 within the processing circuit 102 generates the control signal Vc to the switch circuit 110 to switch to the horizontal polarized antenna ANT_H, i.e. the vertical polarized antenna ANT_V1 and the horizontal polarized antenna ANT_H are configured as the second type of antenna combination for signal transmission and reception. The switch circuit 110 may disable connection between the vertical polarized antenna ANT_V2 and the bandpass filter 120 at this point. The processing circuit 102 may then obtain a second signal through various signal transmission mechanisms, and calculate a second signal quality parameter according to the second signal. In one embodiment, the processing circuit 102 may transmit one or more ping packets to the external electronic devices. As the ping packets may be packaged as one radiotap frame before being transmitted, and radiotap header of this radiotap frame comprises information such as a noise field (signal strength), a signal field (signal strength) and a rate, the processing circuit 102 may calculate a second RSSI and a second PHY rate according to the radiotap frame(s) to be the second signal quality parameter.

In Step 208, the processing circuit 102 selects the first type of antenna combination or the second type of antenna combination according to the first signal quality parameter and the second signal quality parameter, i.e. selects one of the vertical polarized antenna ANT_V2 and the horizontal polarized antenna ANT_H, to be matched with the vertical polarized antenna ANT_V1 for subsequent signal transmission and reception. For example, the processing circuit 102 may determine a magnitude relationship between the second RSSI and the first RSSI, and/or determine a magnitude relationship between the second PHY rate and the first PHY rate, for deciding to select the first type of antenna combination or the second type of antenna combination.

In one embodiment, in order to prevent the switch circuit 110 from switching antennas too many times, the antenna selection mechanism in Step 208 may determine the selected combination according to the currently utilized antenna combination. In particular, assuming that the two vertical polarized antennas ANT_V1 and ANT_V2 are utilized in Step 204 for calculating the first RSSI and the first PHY rate, and the vertical polarized antenna ANT_V1 and the horizontal polarized antenna ANT_H are utilized in Step 206 for calculating the second RSSI and the second PHY rate, as Step 206 is executed later than Step 204, i.e. the vertical polarized antenna ANT_V1 and the horizontal polarized antenna ANT_H are currently utilized for signal transmission and reception, only when the first RSSI is greater than the second RSSI and the first PHY rate is greater than the second PHY rate will the processing circuit 102 switch from the horizontal polarized antenna ANT_H to the vertical polarized antenna ANT_V2 for matching with the vertical polarized antenna ANT_V1 for subsequent signal transmission and reception; and by comparison, if execution orders of Steps 204 and 206 are exchanged, as Step 204 is now executed later than Step 206, i.e. the two vertical polarized antennas ANT_V1 and ANT_V2 are currently utilized for signal transmission and reception, only when the second RSSI is greater than the first RSSI and the second PHY rate is greater than the first PHY rate will the processing circuit 102 switch from the vertical polarized antenna ANT_V2 to the horizontal polarized antenna ANT_H.

Figure 3:
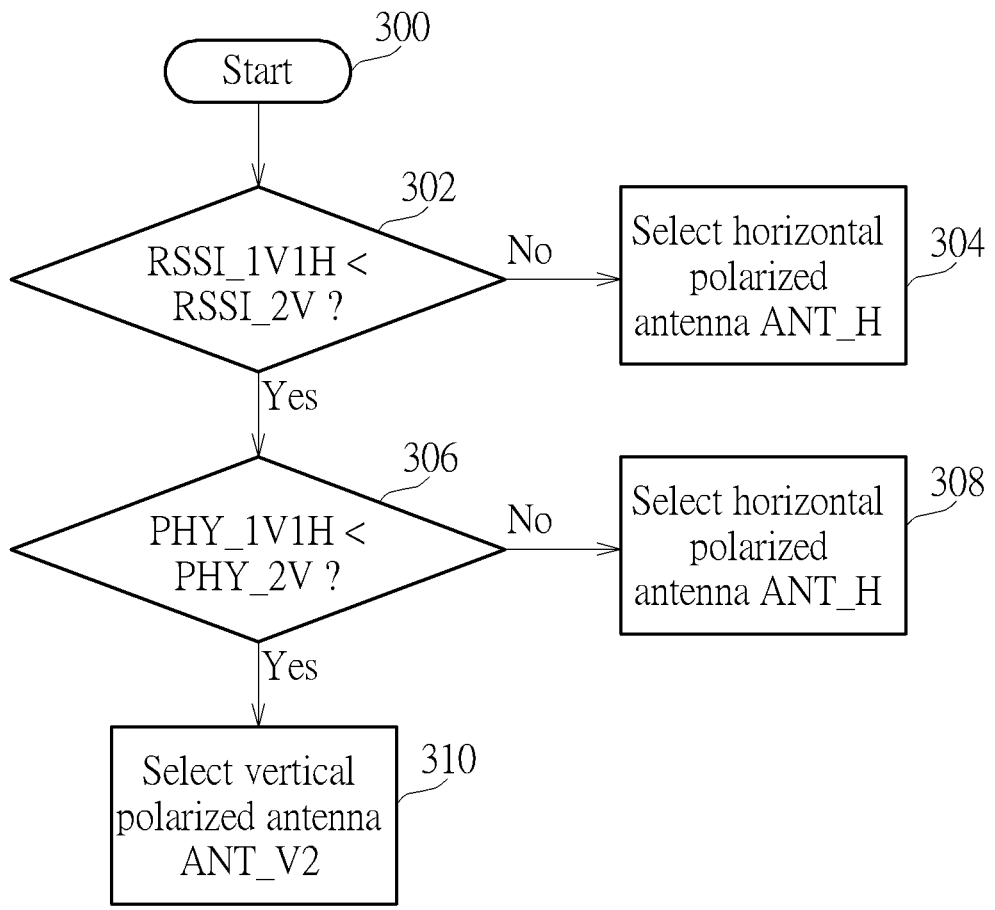
FIG. 3 is a detailed flowchart illustrating Step 208 shown in FIG. 2 according to an embodiment of the present invention.

The flow shown in FIG. 3 may be an example of Step 208 for further illustration. In Step 300, the flow starts, and it is assumed that the processing circuit 102 selects the horizontal polarized antenna ANT_H at this point. In Step 302, the processing circuit 102 determines whether the second RSSI (which is referred to as RSSI_1V1H in the figure) is less than the first RSSI (which is referred to as RSSI_2V in the figure). If the determination is "Yes", the flow enters Step 306; if the determination is "No", the flow enters Step 304 to select the horizontal polarized antenna ANT_H. In Step 302, the processing circuit 102 determines whether the second PHY rate (which is referred to as PHY_1V1H in the figure) is less than the first PHY rate (which is referred to as PHY_2V in the figure). If the determination is "Yes", the flow enters Step 310 to select the vertical polarized antenna ANT_V2; if the determination is "No", the flow enters Step 308 to select the horizontal polarized antenna ANT_H.

In the flow shown in FIG. 3, the determination of the RSSI is earlier than the determination of the PHY rate. The PHY rate is taken as the main determination factor as the PHY rate can accurately reflect performance of wireless communications, whereas the RSSI cannot reflect performance and impact of the wireless communications due to antenna isolation factors.

Furthermore, the antenna selection mechanism of the Wi-Fi extender 100 is mainly applied to communications of the backhaul, which evaluates signals between the Wi-Fi extender 100 and other electronic devices (e.g. the access points and the router) to maintain high throughput. In general, the position of the Wi-Fi extender 100 is fixed and kept unchanged after setting and initialization. Thus, in one embodiment, after determining the first type of antenna combination or the second type of antenna combination through the aforementioned antenna selection mechanism and using the selected antenna combination for performing communication with electronic devices such as a mobile phone and a laptop computer, the Wi-Fi extender 100 will not re-change/switch different antenna combinations due to signal quality between the Wi-Fi extender 100 and the mobile phone or the laptop computer during the communications.

Briefly summarized, the Wi-Fi extender of the present invention and associated antenna selection method can compare signal qualities of two antenna combinations, in order to select the antenna combination having the better signal quality for subsequent signal transmission and reception. Thus, under a condition where a size of a Wi-Fi extender decreases and an operating position thereof is uncertain, the Wi-Fi extender can still provide good communication quality.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An antenna selection method, comprising:
   utilizing a first vertical polarized antenna and a second vertical polarized antenna to obtain a first signal;
   calculating a first signal quality parameter according to the first signal;
   utilizing the first vertical polarized antenna and a horizontal polarized antenna to obtain a second signal;
   calculating a second signal quality parameter according to the second signal; and
   selecting one of the second vertical polarized antenna and the horizontal polarized antenna according to the first signal quality parameter and the second signal quality parameter, to be matched with the first vertical polarized antenna for subsequent signal transmission and reception;
   wherein the first signal quality parameter comprises a first RSSI and a first PHY rate, the second signal quality parameter comprises a second RSSI and a second PHY rate, and the step of selecting one of the second vertical polarized antenna and the horizontal polarized antenna according to the first signal quality parameter and the second signal quality parameter to be matched with the first vertical polarized antenna for subsequent signal transmission and reception comprises:
      when the first vertical polarized antenna and the second vertical polarized antenna are currently utilized to perform signal transmission and reception, switching from the second vertical polarized antenna to be matched with the first vertical polarized antenna for subsequent signal transmission and reception only when the second RSSI is greater than the first RSSI and the second PHY rate is greater than the first PHY rate; and
      when the first vertical polarized antenna and the horizontal polarized antenna are currently utilized to perform signal transmission and reception, switching from the horizontal polarized antenna to the second vertical polarized antenna to be matched with the first vertical polarized antenna for subsequent signal transmission and reception only when the first RSSI is greater than the second RSSI and the first PHY rate is greater than the second PHY rate.

2. The antenna selection method of claim 1, wherein the first signal and the second signal are frames comprising ping packets.

3. The antenna selection method of claim 2, wherein the steps of calculating the first signal quality parameter according to the first signal and calculating the second signal quality parameter according to the second signal comprise:
   calculating a first RSSI and a first PHY rate according to a signal field and a noise field of the first signal; and
   calculating a second RSSI and a second PHY rate according to a signal field and a noise field of the second signal.

4. A Wi-Fi extender, comprising:
   a first vertical polarized antenna;
   a second vertical polarized antenna;
   a horizontal polarized antenna;
   a processing circuit, wherein the processing circuit utilizes the first vertical polarized antenna and the second vertical polarized antenna to obtain a first signal for calculating a first signal quality parameter according to the first signal, and utilizes the first vertical polarized antenna and the horizontal polarized antenna to obtain a second signal for calculating a second signal quality parameter according to the second signal; and the processing circuit selects one of the second vertical polarized antenna and the horizontal polarized antenna according to the first signal quality parameter and the second signal quality parameter, to be matched with the first vertical polarized antenna for subsequent signal transmission and reception;
   wherein the first signal quality parameter comprises a first RSSI and a first PHY rate, the second signal quality parameter comprises a second RSSI and a second PHY rate; when the first vertical polarized antenna and the second vertical polarized antenna are currently utilized to perform signal transmission and reception, the processing circuit switches the second vertical polarized antenna to the horizontal polarized antenna to be matched with the first vertical polarized antenna for subsequent signal transmission and reception only when the second RSSI is greater than the first RSSI and the second PHY rate is greater than the first PHY rate; and when the first vertical polarized antenna and the horizontal polarized antenna are currently utilized to perform signal transmission and reception, the processing circuit switches the horizontal polarized antenna to the second vertical polarized antenna, to be matched with the first vertical polarized antenna for subsequent signal transmission and reception only when the first RSSI is greater than the second RSSI and the first PHY rate is greater than the second PHY rate.

5. The Wi-Fi extender of claim 4, wherein the first signal and the second signal are frames comprising ping packets.

6. The Wi-Fi extender of claim 5, wherein the processing circuit calculates a first RSSI and a first PHY rate according to a signal field and a noise field of the first signal, and calculates a second RSSI and a second PHY rate according to a signal field and a noise field of the second signal.

* * * * *